(12) United States Patent
Collado

(10) Patent No.: US 8,684,330 B2
(45) Date of Patent: Apr. 1, 2014

(54) DEVICE FOR SELECTIVELY BLOCKING A FLUID PASSAGE

(75) Inventor: Pedro Collado, Ozoir la Ferriere (FR)

(73) Assignee: L'Air Liquide, Société Anonyme pour l'Étude et l'Éxploitation des Procédés Georges Claude, Paris (FR)

( * ) Notice: Subject to any disclaimer, the term of this patent is extended or adjusted under 35 U.S.C. 154(b) by 289 days.

(21) Appl. No.: 13/144,054

(22) PCT Filed: Jan. 27, 2010

(86) PCT No.: PCT/FR2010/050118
§ 371 (c)(1),
(2), (4) Date: Jul. 11, 2011

(87) PCT Pub. No.: WO2010/089490
PCT Pub. Date: Aug. 12, 2010

(65) Prior Publication Data
US 2011/0277872 A1      Nov. 17, 2011

(30) Foreign Application Priority Data
Feb. 3, 2009 (FR) ...................................... 09 00445

(51) Int. Cl.
*F16L 37/28*  (2006.01)

(52) U.S. Cl.
USPC .................. 251/149.6; 251/149.8; 251/149.9; 251/144

(58) Field of Classification Search
USPC ............ 251/149.1, 149.6, 149.7, 144, 149.3, 251/332, 339; 137/614.2, 614.21; 128/205.24, 205.22
See application file for complete search history.

(56) References Cited

U.S. PATENT DOCUMENTS 2,830,620 A * 4/1958 Shuptrine ................ 137/630.19
2,885,176 A * 5/1959 Bryant .......................... 251/172

(Continued)

FOREIGN PATENT DOCUMENTS

DE      21 29 800       1/1973

OTHER PUBLICATIONS

French Search Report for FR 0900445, Oct. 6, 2009.

(Continued)

*Primary Examiner* — John K Fristoe, Jr.
*Assistant Examiner* — Marina Tietjen
(74) *Attorney, Agent, or Firm* — Allen E. White

(57) ABSTRACT

The invention relates to a device for selectively blocking a fluid passage, particularly for a tap-filling intake, including a structure defining a channel for the passage of a fluid extending between an inlet at an upstream end and an outlet at a downstream end, a valve seat, a valve selectively mobile in the channel between a first position for blocking the passage by sealingly bearing on the seat and a second position for opening the passage in which the valve is not sealingly bearing on the seat, wherein the blocking device includes a deformable seal, supported by the mobile valve and/or the seat, for bearing against the seat and ensuring the seal of the blocking when the valve is in the first position, characterized in that the mobile valve includes a main body and a stop mobile relative to the main body, the main body and the mobile abutment defining a mechanism for selectively pressurizing the seal and movable between a working position for pressuring the seal for increasing the force thereof on the seat and a rest position in which the pressure on the seal is released so as to reduce the force thereof on the seat.

16 Claims, 1 Drawing Sheet

(56) References Cited

U.S. PATENT DOCUMENTS

| | | | |
|---|---|---|---|
| 3,084,903 A * | 4/1963 | Parks | 251/187 |
| 3,318,346 A * | 5/1967 | Wolfgang | 141/293 |
| 4,341,370 A * | 7/1982 | Banks | 251/282 |
| 4,408,632 A | 10/1983 | Kent | |
| 4,688,757 A * | 8/1987 | Cook et al. | 251/210 |
| 5,413,230 A | 5/1995 | Folter et al. | |
| 6,378,742 B1 * | 4/2002 | Rohr et al. | 222/494 |
| 6,889,731 B2 * | 5/2005 | Vallon et al. | 141/351 |
| 6,901,958 B2 * | 6/2005 | Taylor | 137/614.2 |
| 7,185,674 B2 * | 3/2007 | Taylor | 137/614.2 |
| 7,341,075 B2 * | 3/2008 | Taylor | 137/614.2 |
| 7,686,017 B2 * | 3/2010 | Taylor | 128/202.14 |

OTHER PUBLICATIONS

International Search Report for PCT/FR2010/050118, May 17, 2010.

* cited by examiner

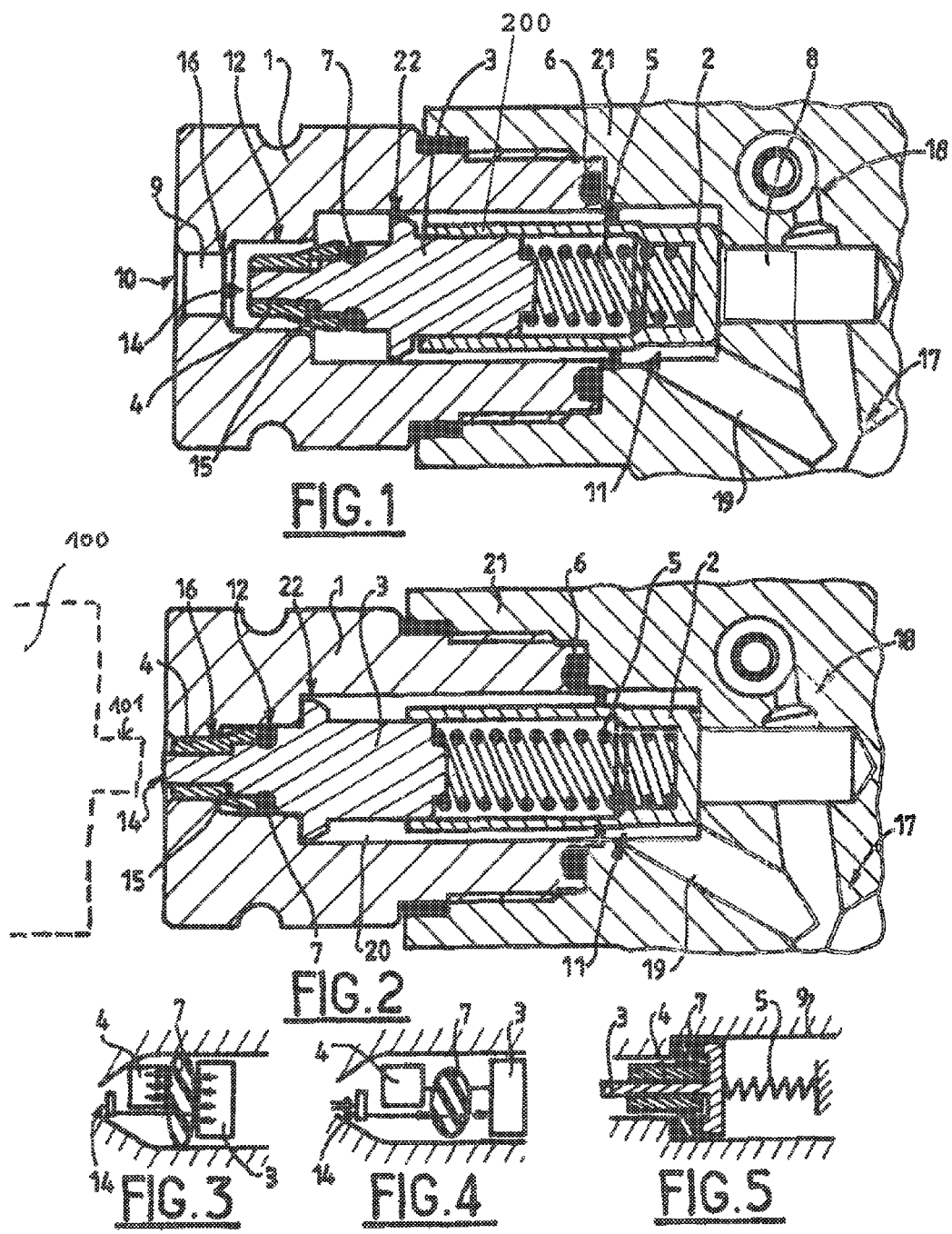

DEVICE FOR SELECTIVELY BLOCKING A FLUID PASSAGE

CROSS REFERENCE TO RELATED APPLICATIONS

This application is a 371 of International PCT Application PC/FR2010/050118, filed Jan. 27, 2010, which claims priority to French Application No. 0900445 filed Feb. 3, 2009, the entire contents of which are incorporated herein by reference.

BACKGROUND

This invention relates to a device for selectively blocking a fluid passage, a tap provided with such a device and a corresponding filling method.

More specifically, the invention relates to a device for selectively blocking a fluid passage, in particular for a filling intake of a gas tap.

Such a device conventionally comprises a structure defining a channel for the passage of fluid extending between an inlet located at an upstream extremity and an outlet located at a downstream extremity, a valve seat, a valve in the channel that is selectively moveable between a first position for blocking the passage by sealingly bearing against the seat and a second position for opening the passage without sealingly bearing against the seat, a return member pushing the valve towards its first position, the blocking device having a deformable sealing joint supported by the moveable valve and/or by the seat, to bear against the seat and to ensure the seal of the blocking when the valve is in its first position, the moveable valve comprising an upstream extremity intended to be subjected to an opening pressure to move the valve to its second position.

When filling, the valve is opened for example by a mechanical pressure and/or by the pressure of the filling gas.

This type of device is sometimes known as a filling valve or a check valve. When using these valves in filling intakes for gas taps, over time the packing seal of the valve may become worn. Such wear of the packing seal may be caused by the succession of opening/closing cycles of the valve. This wear may cause the appearance of leaks over time. Wear is frequently caused by friction of the joint in its housing. This is particularly prejudicial in products that require a relatively long service life without maintenance (for example: ten years).

To resolve this sealing problem, one solution comprises providing an additional metal stopper in series with the valve. This additional stopper must therefore be removed (unscrewed) before each filling, and must be returned after filling (screwed). This solution takes time and generates potential safety risks.

One objective of this invention is to mitigate some or all of the drawbacks of the prior art as set out above.

For this purpose, the device according to the invention, which otherwise matches the generic definition given in the preamble above, is essentially characterized in that the moveable valve comprises a main body and a stop that is moveable in relation to the main body, the main body and the moveable stop forming a mechanism for selectively pressurizing the joint that is moveable between a working position pressurizing the joint to increase the force it exerts on the seat and a resting position releasing the pressure on the joint to reduce the force it exerts on the seat.

The embodiments provide for a self-tightening blocking valve that makes good any defects in the parts, limits its wear, and even offsets any wearing of the joints.

Moreover, the embodiments of the invention may have one or more of the following characteristics:

the mechanism for selectively pressurizing the joint can be moved between the working position and the rest position independently or separately from the movement of the moveable valve in relation to the seat, when the valve moves from its second position to its first position, the moveable stop or the main body first stops against a fixed portion of the structure, to cause a relative movement between the main body and the moveable stop that moves the mechanism for selectively pressurizing the joint into its working position, on the upstream side, the main body or the moveable stop projects such that it is subjected first to an opening pressure and thus causes a relative movement between the main body and the moveable stop that moves the mechanism for selectively pressurizing the joint to its resting position, the main body and the moveable stop are shaped relatively to automatically move the mechanism for selectively pressurizing the joint into the working position when the valve is in its first blocking position, the main body and the moveable stop are shaped relatively to automatically move the mechanism for selectively pressurizing the joint into the resting position once or before the valve starts its movement towards its second position, the sealing joint is located on the moveable valve, the mechanism for selectively pressurizing the joint selectively compresses the joint to increase the footprint of the joint in the direction of the seat, the exterior surface of the moveable stop is combined with a reception zone of the channel and, when the valve is in its first position, the moveable stop blocks the channel in cooperation with this reception zone to form a second blocking zone, distinct from the blocking zone formed around the deformable joint, the moveable stop comprises an exterior shape forming a deflector for the fluid, to prevent or limit the direct impact of the fluid stream on the joint during filling operations, the main body and the moveable stop include combined forms forming a retainer limiting their relative movement in the direction of joint pressurization, to keep the level of pressurization of the joint within a determined threshold, the joint is selectively pressurized by compressing it, the main body and the moveable stop are relatively moveable in at least one traveling movement, the sealing joint is an O-ring, the surface of the seat intended to cooperate with the joint being cylindrical, the mechanism to selectively pressurize the joint is realized by sandwiching the joint between the main body and the moveable stop of the valve, the moveable stop comprises or includes a metallic material and, when the stop blocks the channel, this moveable stop co-operates with a metallic portion of the channel to create a metal/metal contact, the main body of the moveable valve is guided in a traveling movement into a fixed tube, the return member being housed in the tube, a passage is provided for the carriage of gas during filling operations between the exterior surface of the main body of the moveable valve and the structure, a passage is provided for the carriage of the gas during filling operations between the exterior surface of the tube and the structure, the blocking device is assembled removably on a tap or is a one-piece unit with a tap, an interstice is provided for the gas between the main body of the moveable valve and the fixed tube, to prevent an excessive pressure increase in the tube when the main body penetrates the tube, the upstream extremity of the main body that projects relative to the moveable stop includes a pressure surface intended to be pushed by a tool of a gas filling connection, to move the moveable valve towards its second position, the device includes a filter placed at its downstream extremity, the filter being placed on an extraction channel, the extraction channel linking a first extremity intended to be linked to the interior of a gas storage facility and a second extremity intended to be connected to a gas extraction connection, when the valve moves from its second position to its first position, the moveable stop and the main body first effect a simultaneous movement, then the moveable stop stops against a portion of the structure while the main body continues an additional movement to an upstream limit position, to cause a relative movement between the main body and the moveable stop which moves the mechanism for selectively pressurizing the joint into its working position, the upstream limit position of the main body is defined by a mechanical stop of the main body against the moveable stop and/or against a fixed portion of the structure, when the valve is in the first position, the main body comprises an upstream support surface that projects on the upstream side in relation to the moveable stop such that it is subjected first to an opening pressure and thus causes a relative movement between the main body and the moveable stop that moves the mechanism for selectively pressurizing the joint to its resting position, when the valve is in its first position and it is subjected to a determined opening pressure, the main body only is first moved towards the second opening position to effect a relative movement between the main body and the moveable stop which moves the mechanism for selectively pressurizing the joint to its resting position, then when the main body reaches its flush position with the moveable stop the opening pressure then simultaneously moves the main body and the moveable stop, the upstream extremities of the main body and of the moveable stop include respective pressure surfaces intended to receive a mechanical opening pressure, the joint is an O-ring and is housed in an annular housing delimited by the main body and the moveable stop, the moveable stop having an exterior surface forming a guide ramp for the fluid stream above the joint.

The invention also relates to a tap for controlling the pressurized gas of a recipient, comprising a filling connection according to any one of the characteristics above or below.

The invention also concerns a method for filling a gas container fitted with a blocking device according to any one of the characteristics above or below using a filling tool comprising a mechanical pusher intended to supply a mechanical opening pressure to the valve, in which, when opening the valve, in a first opening phase the outermost surface of the pusher first mechanically pushes the main body and thus moves the main body relative to the moveable stop to put the mechanism for selectively pressurizing the joint into its resting position, then, in a second opening phase, the outermost surface of the pusher mechanically pushes the moveable stop and the body jointly to put the valve in its second open position.

According to other possible characteristics:

when closing the valve by withdrawing the pusher, in a first closing phase the moveable stop and the body move jointly towards the first position then, in a second closing phase, the moveable stop stops against a fixed part of the structure while the main body continues an additional movement to an upstream limit position, to cause a relative movement between the main body and the moveable stop which moves the mechanism for selectively pressurizing the joint to its working position, during the opening operation the mechanism for selectively pressurizing the joint is moved to its resting position before or at the same time that the joint is moved from its seat, when filling is complete, during the closing operation the mechanism for selectively pressurizing the joint is moved to its working position at the time that or after the valve reaches its first closed position.

The invention may also relate to any alternative device or method comprising any combination of the characteristics above and below.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein:

Other characteristics and benefits are set out in the description below, provided with reference to the figures in which:

FIG. 1 is a schematic and partial cross section illustrating a sample embodiment of a blocking device according to the invention, in open position, FIG. 2 is a similar view of the device in FIG. 1 in closed position, FIGS. 3 and 4 are simplified schematic views showing the operating principle of the invention (device respectively in closed and open positions), FIG. 5 is a schematic and partial cross section showing another possible sample embodiment of the invention.

DESCRIPTION OF PREFERRED EMBODIMENTS

FIG. 1 shows a filling intake, for example of a gas bottle tap (tap with or without built-in regulator).

The filling intake is preferably a quick-connection intake. This filling intake is a mechanism used to safely fill a gas bottle.

The filling intake includes a selective blocking device an example of which will be described in detail. The blocking device is designed to ensure that filling (opening) is only permitted during a given process and to automatically seal closed once filling is complete.

In the non-limiting example shown in FIGS. 1 and 2, the device includes a structure 1 or base housing all or some of the component parts. The structure 1 may for example be screwed to the body of a tap 21. A joint 6 may be provided to create the seal between the structure 1 and the body 21 of the tap.

The structure 1 defines a channel 9 for the passage of fluid extending between an inlet 10 located at an upstream extremity (outer side) and an outlet 11 located at a downstream extremity (inner side of the tap).

A valve 3, 4 is fitted movably in the channel. The valve 3, 4 is forced towards a seat 2 (closed position) by a return spring 5. Preferably, an intermediate tube 2 is placed in the structure and houses the spring 5. Furthermore, the valve 3, 4 is guided in a traveling movement into the tube 2. Furthermore, the downstream extremity of the tube 200 may also be designed to hold a filter 8 in position in a channel.

The upstream extremity of the valve 3, 4 is designed to be pushed by a filling tool 100 in order to open the passage for the filling gas flowing downstream (see FIG. 2). The moveable valve 3, 4 includes a main body 3 and a stop 4 that is moveable relative to the main body. For example, the moveable stop 4 is guided in a traveling movement over the upstream extremity of the main body 3 of the valve. The main body 3 of the valve has a sealing joint 6 located between a shoulder of the main body 3 and an extremity of the moveable stop 4. Preferably, the joint 7 is a deformable O-ring joint designed to cooperate, for example radially, with a seat 12 formed for example by a cylindrical portion of the channel 9.

FIG. 2 shows the device in closed position.

The moveable stop 4 is blocked against the structure 1 under the action of the spring 5.

Preferably, the stop 4 has a complimentary shape of its reception zone (e.g. circular edge 16) on the body 1 also to provide a blocking action (in addition to the sealed blocking of the joint 7). For example, the moveable stop 4 has an exterior conical shape that cooperates with a circular edge 16 in the channel 9.

Contact between this cone of the moveable stop 4 and the edge 16 is for example a metal/metal contact creating a seal that protects the interior of the channel against the risk of ingress of impurities.

In this closed position, the main body 3 of the valve is preferably butted against the moveable filling valve 4 (stop 15). Under the action of the spring 5 and the stop 4 against the channel, the upstream extremity 14 of the main body 3 of the valve projects upstream beyond the moveable stop.

In this closed position, the O-ring joint 7 located between two shoulders belonging respectively to the valve body and the moveable stop 4 is compressed (for example laterally). The stop 15 between the two relatively moveable parts 3 and 4 of the valve makes it possible to control compression of the joint 7. This controlled compression of the joint 7 increases the exterior diameter of the joint 7. The effect of this is to press the joint 7 against the bore (seat 12). This clamping force of the joint 7 makes it possible to improve the seal and in particular to make good any wear and defects in the parts. FIG. 3 is a schematic diagram of the principle of the closed position (compression of the joint 7 in closed position between the two moveable parts 3 and 4). To open the device, a user inserts into the channel on the upstream side a filling intake 100 that has an extremity 101 or a push rod 101 intended to mechanically push the extremity of the moveable valve 3, 4.

On account of the projection 14 of the main body 3 in relation to the moveable stop 4, the opening tool starts by pushing against the main body 3 (before pushing the moveable stop 4). The tool then pushes the main body 3 downstream in relation to the moveable stop 4. The effect of this is to increase the width of the groove housing that joint 7 and therefore to release the compression force on this latter.

FIG. 4 is a schematic diagram of the principle of the open position (pressing on the upstream extremity 14 causes the separation of the two moveable parts 3, 4 to release the pressure on the joint 7).

Continuing its course, the filling tool 100, 101 then presses simultaneously on the main body 3 of the valve and on the moveable stop 4. The pressure on the joint 7 having been reduced, the joint 7 then has a smaller exterior footprint (towards the seat 12). This reduces or eliminates its friction against the bore (seat 12) during movement of the valve 3, 4 to the open position (FIG. 1). This friction reduction reduces the risk of wear. Preferably compression of the joint 7 is reduced before or at the beginning of the movement of the valve 3, 4 to its open position.

Naturally, alternatively, the pressurization or pressure-release sequences of the joint 7 independent of the movement of the joint 7 may also be obtained by the shape of the pusher 101 of the filling tool. This means that, when the valve 3, 4 is in its first closed position, it is not necessary for the main body 3 to project upstream in relation to the moveable stop 4.

Advantageously, as shown, the main body 3 of the valve may be guided in a traveling movement into the tube 2. Preferably, the radial clearance between the main body 3 of the valve and the tube 2 is selected such as to obviate the need for perforations in the tube 2 to release gas pressure when the main body 3 penetrates the tube 2.

The profile of the moveable stop 4 is preferably determined to orient and direct the gas stream during filling such as to minimize interference with the joint 7 (see figures, the exterior conical surface forms for example a ramp that directs the stream above or below the joint 7).

Furthermore, the main body 3 of the valve may include a flange to maximize the passage of the gas in the extraction direction (upstream). The flange 22 forms for example a ramp encouraging the upstream flow of the gas (to the detriment of the downstream flow). The filling gas inserted may then circulate for example around the tube 2 before reaching an aperture 11 connected to a pipe 19 of a tap for example. For example, the exterior surface of the tube 2 may have a square cross section and cooperate with a cylindrical or parallelepiped bore. The exterior profile of the tube 2 may be for example machined to fit the inside of the structure 1.

The tube 200 may be used to block a filter 8 in its housing located on an extraction pipe having an extremity 17 linked to the gas and an extremity 18 linked to an extraction outlet of a tap for example.

In this way, the valve spring 5 is completely protected in its housing defined by the tube 2. This configuration minimizes the potential contact between the spring 5 with the gas moving through the filling intake.

It can therefore easily be seen that, while being a simple and cheap structure, the device according to the invention provides a high-quality seal. The structure and the operation of the sealing device during filling operations improve the safety of filling for the subsequent user of the cylinder or recipient filled.

Furthermore, wear of the sealing joint 7 is minimized by selectively expanding and narrowing the groove of the joint 7 (enlarging when the valve is in the closed position, narrowing when the valve opens). This improves the service life of the device.

The invention has a self-tightening function that guarantees a leak-free seal, even after several years' operation and even in the event of wear of the sealing joint 7. Furthermore, the additional optional seal at the end of the valve (moveable stop 4 against its seat 16) provides an additional safety function. This second block performs a safety function by preventing the ingress of unwanted bodies and minimizes the risk of leaks in the event of failure of the joint 7.

Preferably, the valve spring 5 is protected from the gas stream in its tube 2. This limits the risk of ignition under adiabatic compression when used with oxygen.

The invention thereby makes it possible to provide a perfect seal of the device, even if the sealing joint is worn over time, on account for example of maximum tightening of the joint when the seal is required.

Naturally, the invention is not limited to the sample embodiment described above. For example, it is possible to envisage that the deformable joint 7 is fixed, for example to the channel 9 as shown schematically in FIG. 5. As above, the valve 3, 4 forms a mechanism for selectively pressurizing the joint when closed. A return member such as a spring 5 compresses the joint 7 via the main body 3 of the valve. When opening (valve 3, 4 pushed out of the seat), the main body 3 of the valve is actuated before the moveable stop 4 to release the pressure on the fixed joint 7. The valve 3, 4 may then move without creating excessive friction with the joint 7. In closed position, the valve 3, 4 is pressed by a spring 5 to closed position.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A blocking device for selectively blocking a fluid passage for a filling intake, comprising:
   a) a structure (1) defining a channel (9) for the passage of fluid extending between an inlet (10) located at an upstream extremity and an outlet (11) located at a downstream extremity,
   b) a valve seat (12),
   c) a moveable valve (3, 4) that is selectively moveable in the channel (9) between
      i) a first position configured to block the passage by contacting the seat (12) to form a seal and
      ii) a second position configured to open the passage wherein the valve is not in contact with the seat (12),
   d) a return member (5) adapted to force the moveable valve (3, 4) towards the first position,
   e) a deformable sealing joint (7) supported by the moveable valve (3, 4) and/or by the seat (12) configured to press against the seat (12) and to form the seal when the valve (3, 4) is in the first position,
   wherein the moveable valve (3, 4) comprises
      a) an upstream extremity (14) adapted to move the moveable valve (3, 4) towards the second position when the upstream extremity (14) is subjected to an opening pressure,
      b) a main body (3) and a stop (4) that is moveable relative to the main body (3),
      c) the main body (3) and the moveable stop (4) configured to form a mechanism for selectively pressurizing the joint (7) that is adapted to switch between
         i) a working position adapted to pressurize the joint (7) to increase a force that joint (7) exerts on the seat (12), and
         ii) a resting position adapted to release the pressure on the joint (7) to thereby reduce the force joint (7) exerts on the seat (12),
   and wherein the valve is configured so that when the valve (3, 4) moves from the second position (16) to the first position, the stop (4) stops first against a fixed portion of the structure (1) while the main body (3) effects an additional movement causing a relative movement between the main body (3) and the stop (4) that moves the mechanism for selectively pressurizing the joint (7) into its working position.

2. The device of claim 1, wherein when the valve (3, 4) moves from the second position to the first position, the moveable stop (4) and the main body (3) are configured to first effect a simultaneous movement, then the moveable stop (4) stops against a portion of the structure (1) while the main body (3) continues an additional movement to an upstream limit position, to cause a relative movement between the main body (3) and the moveable stop (4) adapted to move the mechanism for selectively pressurizing the joint (7) into its working position.

3. The device of claim 2, wherein the upstream limit position of the main body (3) is defined by a mechanical stop of the main body (3) against the moveable stop (4) and/or against a fixed portion of the structure (1).

4. The device of claim 1, wherein, when the valve (3, 4) is configured in the first position, the main body (3) comprises an upstream pressure surface that projects on the upstream side in relation to the moveable stop (4) such that the upstream pressure surface is configured to be subjected first to an opening pressure and adapted to cause a relative movement between the main body (3) and the moveable stop (4) that moves the mechanism for selectively pressurizing the joint (7) to its resting position.

5. The device of claim 4, wherein when the valve is configured in the first position, the valve is adapted to respond to a determined opening pressure such that the main body (3) only is first moved towards the second opening position to effect a relative movement between the main body (3) and the moveable stop (4) which moves the mechanism for selectively pressurizing the joint (7) to its resting position, then when the main body (3) reaches a flush position with the moveable stop (4) the opening pressure then simultaneously moves the main body (3) and the moveable stop (4).

6. The device of claim 1, wherein the upstream extremity of the moveable valve (3) and of the moveable stop (4) include respective pressure surfaces designed to receive a mechanical opening pressure.

7. The device of claim 1, wherein the main body (3) and the moveable stop (4) are configured to cooperate mechanically to automatically move the mechanism for selectively pressurizing the joint (7) to the working position when the valve is in the first blocking position.

8. The device of claim 1, wherein the main body (3) and the moveable stop (4) are configured to cooperate mechanically to automatically move the mechanism for selectively pressurizing the joint (7) to the resting position when or before the valve begins to move towards the second position.

9. The device of claim 1, wherein the exterior surface of the moveable stop (4) is combined with a reception zone (16) of the channel (9) and in that, when the valve (3, 4) is configured in the first position, the moveable stop (4) is configured to block the channel (9) in cooperation with the reception zone (16) to form a second blocking zone, distinct from a first blocking zone formed around the deformable joint (7).

10. The device of claim 1, wherein the joint (7) is an O-ring housed in an annular housing delimited by the main body (3) and the moveable stop (4) and the moveable stop has an exterior surface adapted to form a guide ramp for the fluid stream above the joint (7).

11. A tap for controlling pressurized gas of a recipient, comprising a filling connection, wherein the connection includes a device of claim 1.

12. A method for filling a gas container fitted with a blocking device of claim 1 using a filling tool (100) comprising a mechanical pusher (101) adapted to supply a mechanical opening pressure to the valve (3, 4), wherein, when opening the valve (3, 4), in a first opening phase the outermost surface of the pusher (101) first mechanically pushes the main body (3) and thus moves the main body (3) relative to the moveable stop (4) to put the mechanism for selectively pressurizing the joint (7) into its resting position, then, in a second opening phase, the outermost surface of the pusher (101) mechanically pushes the moveable stop (4) and the body (3) jointly to put the valve in its second open position.

13. The method of claim 12, wherein during the opening operation the mechanism for selectively pressurizing the joint (7) is moved to its resting position before or at the same time that the joint (7) is moved from its seat (12).

14. The method of claim 12, wherein, when filling is complete, during the closing operation the mechanism for selectively pressurizing the joint (7) is moved to its working position at the time that or after the valve (3, 4) reaches its first closed position.

15. A method for filling a gas container fitted with a blocking device of claim 1 using a filling tool (100) comprising a mechanical pusher (101) adapted to supply a mechanical opening pressure to the valve (3, 4), wherein, when closing the valve (3, 4) by withdrawing the pusher (101), in a first closing phase the moveable stop (4) and the body (3) move jointly towards the first position then, in a second closing phase, the moveable stop (4) stops against a fixed part (1) of the structure while the main body (3) continues an additional movement to an upstream limit position, to cause a relative movement between the main body (3) and the moveable stop (4) which moves the mechanism for selectively pressurizing the joint (7) to its working position.

16. The method of claim 15, wherein during the opening operation the mechanism for selectively pressurizing the joint (7) is moved to its resting position before or at the same time that the joint (7) is moved from its seat (12).

\* \* \* \* \*